(12) United States Patent
McGrew et al.

(10) Patent No.: US 6,975,765 B2
(45) Date of Patent: Dec. 13, 2005

(54) OPTICALLY VARIABLE FORM BIREFRINGENT STRUCTURE AND METHOD AND SYSTEM AND METHOD FOR READING SAME

(75) Inventors: Stephen P. McGrew, Spokane, WA (US); Sally-Anne Carver, Aldershot (GB)

(73) Assignee: New Light Industries, Ltd., Spokane, WA (US)

( * ) Notice: Subject to any disclaimer, the term of this patent is extended or adjusted under 35 U.S.C. 154(b) by 91 days.

(21) Appl. No.: 10/431,300

(22) Filed: May 6, 2003

(65) Prior Publication Data

US 2004/0223156 A1    Nov. 11, 2004

(51) Int. Cl.[7] .......................... G06K 9/76; G03H 1/00; G01J 4/00
(52) U.S. Cl. .......................... 382/210; 359/2; 356/365
(58) Field of Search .............................. 382/210, 137; 359/2, 483, 494, 566; 283/85, 90; 356/364

(56) References Cited

U.S. PATENT DOCUMENTS

| | | | |
|---|---|---|---|
| 4,589,686 A | * | 5/1986 | McGrew ...................... 283/85 |
| 4,758,296 A | | 7/1988 | McGrew ...................... 156/231 |
| 4,906,315 A | | 3/1990 | McGrew ...................... 156/231 |
| 5,085,514 A | * | 2/1992 | Mallik et al. ................... 359/2 |
| 5,694,247 A | * | 12/1997 | Ophey et al. ................. 359/566 |
| 5,787,102 A | * | 7/1998 | Alexander et al. ............. 372/22 |
| 6,822,769 B1 | * | 11/2004 | Drinkwater et al. ............ 359/2 |

* cited by examiner

Primary Examiner—Kanjibhai Patel

(74) Attorney, Agent, or Firm—Dorsey & Whitney, LLP.

(57) ABSTRACT

An anticounterfeiting device comprising a surface relief structure having both diffractive and polarizing properties. Polarization of reflected light is controlled by the orientation and composition of a fine grating structure whose shortest period is substantially smaller than the wavelength of visible light; and diffraction is controlled by a longer period component of the grating structure having a second orientation. Presence and arrangement of the polarizing properties of the device are detected by illuminating the device with polarized light and viewing the reflected light, or by illuminating the device with unpolarized light and viewing reflected light through a polarizer. Because such a device is difficult to copy or reverse engineer precisely, the authenticity of the device can be judged by the presence and arrangement of the polarization properties and the diffraction properties in the device.

15 Claims, 6 Drawing Sheets

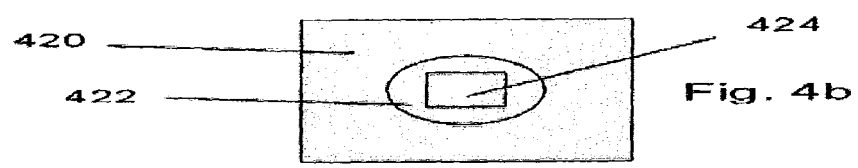
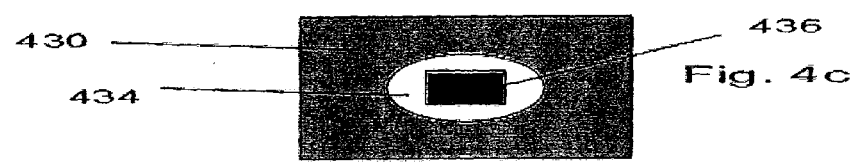
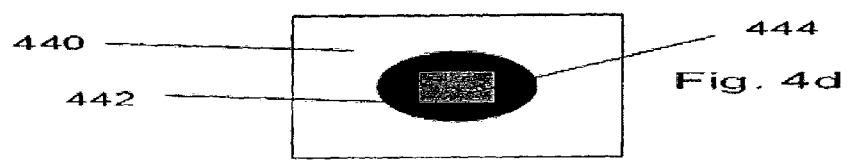
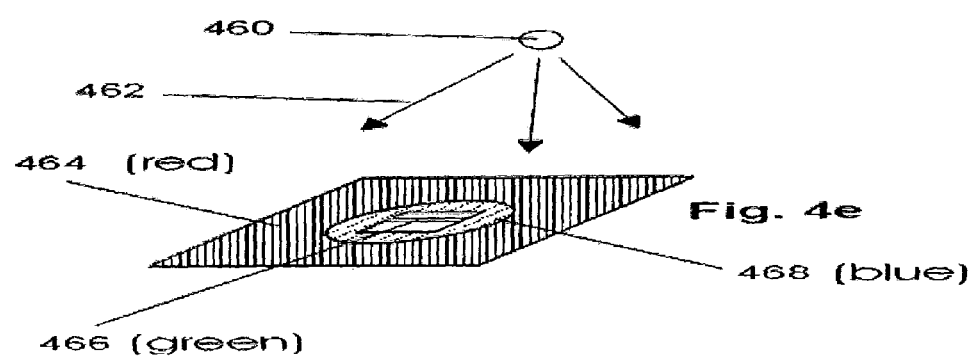

US 6,975,765 B2

OPTICALLY VARIABLE FORM BIREFRINGENT STRUCTURE AND METHOD AND SYSTEM AND METHOD FOR READING SAME

TECHNICAL FIELD

This invention relates to optical devices and readers for optical devices, and, more particularly, to a diffractive grating optical device and reader.

BACKGROUND OF THE INVENTION

In the document and product security industry, it is desirable to have a low-cost anti-counterfeiting device that can be used easily by any consumer. Ideally, the device is inexpensive to make but impossible to duplicate, and easy to verify but applicable to large numbers of different documents and products. Although it is probably not possible to meet those ideals, the various embodiments of the present invention do provide a low-cost anti-counterfeiting device that is very difficult to duplicate or reverse engineer, and that has an appearance visibly different from other optically variable anti-counterfeiting devices. In fact, a polarizing filter can allow easy observation of the distinguishing features of an anti-counterfeiting device made according to the various embodiments of the present invention.

The effective refractive index of a grating layer on a surface depends on the grating orientation and grating profile, as well as on the bulk properties of the material composing the layer. Specifically, when the grating period is significantly smaller than the wavelength of light incident on the grating, the effective refractive index is higher if the electric field vector of the light is aligned with the grating lines rather than being perpendicular to the grating lines. If the material composing the grating layer is metallic, the reflectivity of the layer depends on the alignment of the electric field vector relative to the grating lines. In the first case, the grating layer is birefringent, and in the second case the grating layer is a reflective polarizing filter. Both are referred to herein as cases of "form birefringence".

A common problem in the fabrication of gratings is "ghosting," which are periodic errors in the position or depth of the grating across a surface. For example, in electron-beam fabricated gratings, ghosting can be caused by uneven friction in drive screws, round-off errors in positioning algorithms, or finite step size in stepping motors. A very high frequency (short period) grating that is free of ghosting will show no diffraction effects. However, if ghosting is present with a period greater than half of the wavelength of visible light, diffraction effects appear, showing rainbow colors in white light. The polarization effects of the high-frequency grating are still apparent, however, in direct reflection (zero-order diffraction).

Form birefringence has been demonstrated and reported by several researchers, and is exploited commercially. For example, Nano-Opto Corporation sells a "Subwave Polarization Beam Splitter/Combiner" and a "Broadband Polarizer For Optical Networking Applications" that employ surface relief gratings having a period smaller than an optical wavelength.

SUMMARY OF THE INVENTION

A graphical composition is formed by a high-frequency surface relief grating structure having different grating characteristics in different regions on a surface. The grating structure has a first grating period substantially shorter than a first wavelength of light so that the polarization of light incident on the grating structure is altered by the grating structure in the different regions. As a result, the graphical composition can be viewed based on the arrangement of reflected or transmitted, polarized light in the different regions on the surface. The grating structure also has a second grating period longer than a half-wavelength of the light so that light incident on the structure is diffracted and can be viewed based on the arrangement of light diffracted from the surface. The graphical composition can be detected by a reader having an illumination subsystem to direct illumination light on the graphical composition, and an image detecting subsystem receiving and processing the illumination light reflected from the graphical composition.

BRIEF DESCRIPTION OF THE DRAWINGS

FIGS. 4b, 4c and 4d are isometric views of the graphical composition of FIG. 4 shown exposed to light having different polarization properties.

FIG. 4e illustrates one way an FBS can be illuminated to make the diffraction or "ghosting" components visible.

DETAILED DESCRIPTION OF THE INVENTION

As used herein, the term "form birefringent" is used to mean both the property of altering the polarization of light by differently retarding light of different polarizations, and the property of altering the polarization of light by differently absorbing or reflecting light of different polarizations, as a result of the profile shape of a surface on a subwavelength scale.

According to one embodiment of the present invention, a form birefringent structure ("FBS") with controlled ghosting is fabricated as a marking on a label, document or product. The arrangement of the polarization properties of the FBS and the diffractive properties due to ghosting in the FBS are in the form of graphical designs or other recognizable patterns. Because counterfeiters will find it difficult to copy or reverse engineer such an FBS, authenticity of the marking can be determined by viewing the FBS through a polarizing filter in ordinary white light and observing light diffracted from the FBS (due to ghosting) under illumination from a point light source.

Figure 1:
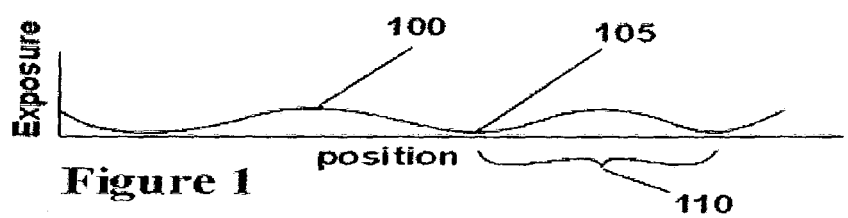
FIG. 1 is a graph representing the distribution of exposure intensity versus position used to produce a low-frequency modulation of a high-frequency grating that can produce a visible or sense able diffraction effect.
Figure 2:
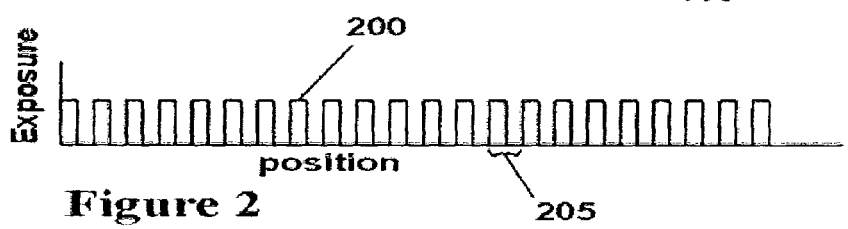
FIG. 2 is a graph representing the distribution of exposure intensity vs position used to produce a high-frequency grating for affecting the polarization of reflected light.

FIG. 1 shows the manner in which a PMMA resist may be exposed to an electron beam, a process well-known in the integrated circuit manufacturing industry. The intensity of the exposure is shown in FIG. 1 plotted along the y-axis, and the location of the exposure along a cross-section of the resist is plotted along the x-axis. In general, the electron beam current density, energy and duration at each point on the resist determines the depth to which the resist is etched during subsequent development. In FIG. 1, the intensity of the exposure 100 varies periodically with a long period 110, to produce a low-frequency grating. In contrast, when a PMMA resist layer is exposed to an electron beam that varies rapidly with a short period 205 from location-to-location, as indicated in FIG. 2, a high-frequency grating will be produced.

Figure 3:
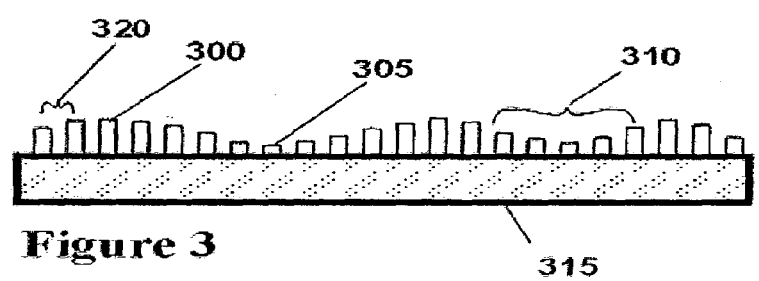
FIG. 3 represents a high-frequency grating that is amplitude modulated according to a low-frequency sinusoidal pattern.

In a preferred embodiment of the invention, a combined high-frequency and low-frequency exposure may be accomplished by modulating the e-beam current in a beam used to draw the high-frequency component, to produce an amplitude modulated high-frequency grating on a substrate 315 as shown in FIG. 3. The high frequency component thus has a maximum intensity at 300 and a minimum intensity at 305. The period 320 of the high-frequency component is the distance between the high frequency exposures, and the period 310 of the low-frequency component is the distance 310 between peaks in the low-frequency variation in the intensity of the high-frequency components. The low-frequency component produces "ghosting," and acts as a diffraction grating having the same grating frequency as the low-frequency component. Thus, in a preferred embodiment of the invention, ghosting is intentionally introduced by varying electron beam current with a controlled period and orientation. A narrow electron beam is preferably used, such as electron beam with a diameter on the order of 0.1 microns or smaller.

As an alternative to modulating the e-beam current used to draw the high-frequency component, a combined high-frequency exposure and low-frequency exposure may be accomplished by first exposing the high-frequency pattern without modulation and then subsequently superimposing a low-frequency exposure. Other techniques may also be used.

Alternatively, two high-frequency gratings may be overlapped, one rotated at an angle to the other. The Moire interference between the two high-frequency gratings produces a low-frequency grating having a period and orientation depending on the orientatation and period of each of the two gratings. If the low-frequency grating thus produced has a period longer than half the wavelength of visible light, it will serve as a diffraction grating while the high-frequency components serve as a polarizing grating. The two overlapping high-frequency gratings may be formed by sequential exposure of photoresist to light in high frequency grating patterns, by electron beam exposure, or by sequentially stamping two high frequency grating patterns into a surface.

Another alternative embodiment of an FBS may contain several regions 410, 405, 400 where at least one region contains a high frequency grating and at least another region contains a low frequency grating. In that case, the properties of the high-frequency containing regions are detectable by viewing in polarized light and the properties of the low-frequency containing regions are detectable by viewing diffracted light from the regions.

Figure 4A:
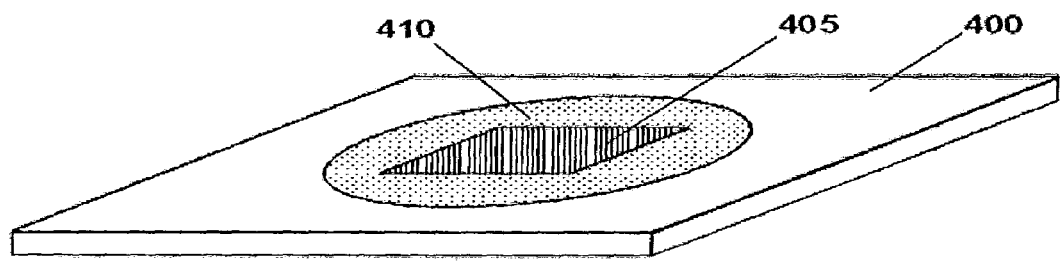
FIG. 4a is a representation of a graphical composition in which different regions have different polarization and diffraction properties.

An FBS may be made in the form of a graphic design such as is illustrated in FIG. 4a, by exposing a layer of PMMA resist to an electron beam in a pattern that combines high-frequency and low-frequency components, and orienting the high-frequency component at each point on a surface in a direction determined separately for each point or group of points. For example, as indicated in FIG. 4a, a gray scale image may be represented as an array of FBS pixels, in which the angle of grating orientation ranges through 90 degrees from horizontal in the area 400 to vertical in the area 405. As a result, when the FBS image is viewed through a vertical polarizing filter, the pixels appear as gray-scale pixels ranging from black to white, as shown in FIG. 4e. The FBS image shown in FIG. 4a can be applied to any of a wide variety of documents and things, including cards, checks, currency, credit cards, gift cards, access control cards, hang tags, decals, stickers, labels, authentication certificates, envelopes, packages, pharmaceuticals containers, pharmaceuticals capsules, licenses, license plates, vehicle use permits, coupons, wrist bands, official documents, certificates of title, optical recording media, CD-ROMs, DVDs, injection molded products, pressure molded products, embossed products, calendared products, passports, security seals, tamper-evident seals, coins, tokens, tickets, transit passes, packaging films and packaging components.

If the low-frequency "ghosting" component is essentially equivalent to the grating pattern in a hologram, then the FBS displays a holographic image when viewed in suitable light, such as light from a point white light source or monochromatic light source. In fact, such a holographic image "ghost" pattern may be produced by first exposing a resist with an electron beam having a high-frequency grating component to provide the polarization component, subsequently exposing the resist to a holographic exposure, and finally developing the resist. The resulting holographic diffraction pattern is then effectively a low-frequency amplitude modulation of the high-frequency grating.

After the FBS is formed in resist, the surface of the resist is preferably electroplated with a suitable material, such as nickel. In the event nickel is used, it may be electroplated to a thickness of about 50 microns. The nickel is then peeled off of the resist to provide a "nickel shim". The nickel shim is wrapped around a headed roller and used to emboss a thermoplastic film. The thermoplastic film is subsequently aluminized in a vacuum metalizer; and the metalized film is converted to a label. FIGS. 4b, 4c and 4d represent a finished label viewed in unpolarized light (FIG. 4b), polarized light oriented in one direction (FIG. 4c), and polarized light oriented in a perpendicular direction (FIG. 4d). FIG. 4e represents the same label viewed in unpolarized light where diffracted light from regions 464, 466, and 468 has a color that depends on the position of light source 460 and the point of view of the observer.

In alternative embodiments, the original FBS may be formed by methods other than electron-beam, such as XUV microlithography, near-field optical microlithography, self-assembled protein structures, or optical interference in a high-refractive index medium.

In alternative embodiments, the "ghosting" can be added in a step subsequent to formation of the FBS rather than in the same step as forming the FBS without ghosting. For example, the ghosting can be created by first exposing a resist layer to an electron beam, XUV or light in a high-frequency pattern and then subsequently exposing the same layer to a low-frequency pattern of light or other radiation. An advantage to adding ghosting in a subsequent step is that it can then be easier to control ghosting separately from the direction and orientation of the high-frequency grating structure.

Alternatively, the FBS can be replicated by a UV embossing process or continuous casting process as described in U.S. Pat. Nos. 4,758,296 and 4,906,315. The UV embossing process has the advantage of having no fidelity losses due to thermal expansion and shrinkage of the resin.

Figure 5:
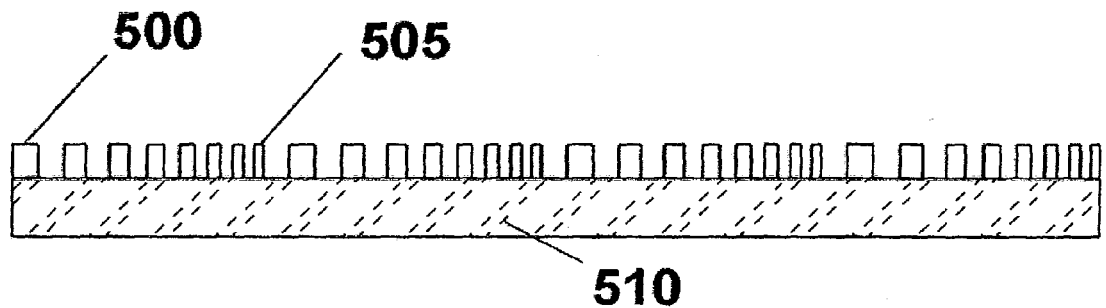
FIG. 5 is a graph representing a high-frequency grating that is "chirped" in a low-frequency periodic pattern to produce a diffractive effect equivalent to that of a blazed diffraction grating.
Figure 6:
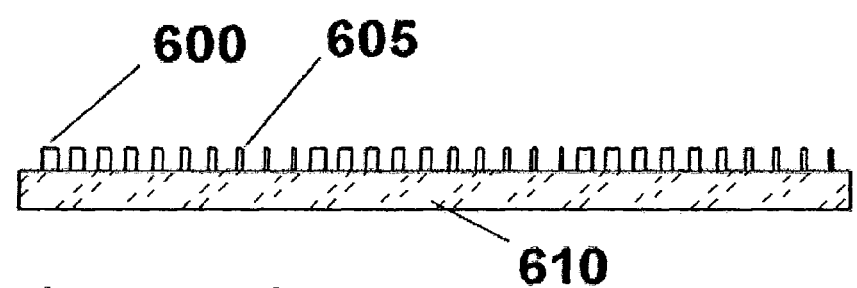
FIG. 6 is a graph representing a high-frequency grating whose ratio of "on" to "off" varies periodically to produce a diffractive effect equivalent to that of a blazed diffraction grating, due to the fact that the grating "on/off" ratio effectively modulates the refractive index of the grating layer when the grating period is substantially shorter than the wavelength of light.

FIGS. 5 and 6 illustrate alternative ways to introduce "ghosting" in a high frequency grating. In FIG. 5, the width and spacing of features formed on a substrate 510 varies between feature 500 and feature 505. In FIG. 6, the width of the features formed on a substrate 610 varies between feature 600 and feature 605 but the center-to-center spacing of the features remains constant. In the ghosting of FIG. 6, if the grating is a transmission grating, the effective refractive index of the embossed layer containing features 600 and 605 varies gradually from 600 to 605 due to the varying width of the features. This effective refractive index variation will produce what amounts to a "blazed" diffraction grating if the period of the variation is greater than a wavelength of light.

Figure 7:
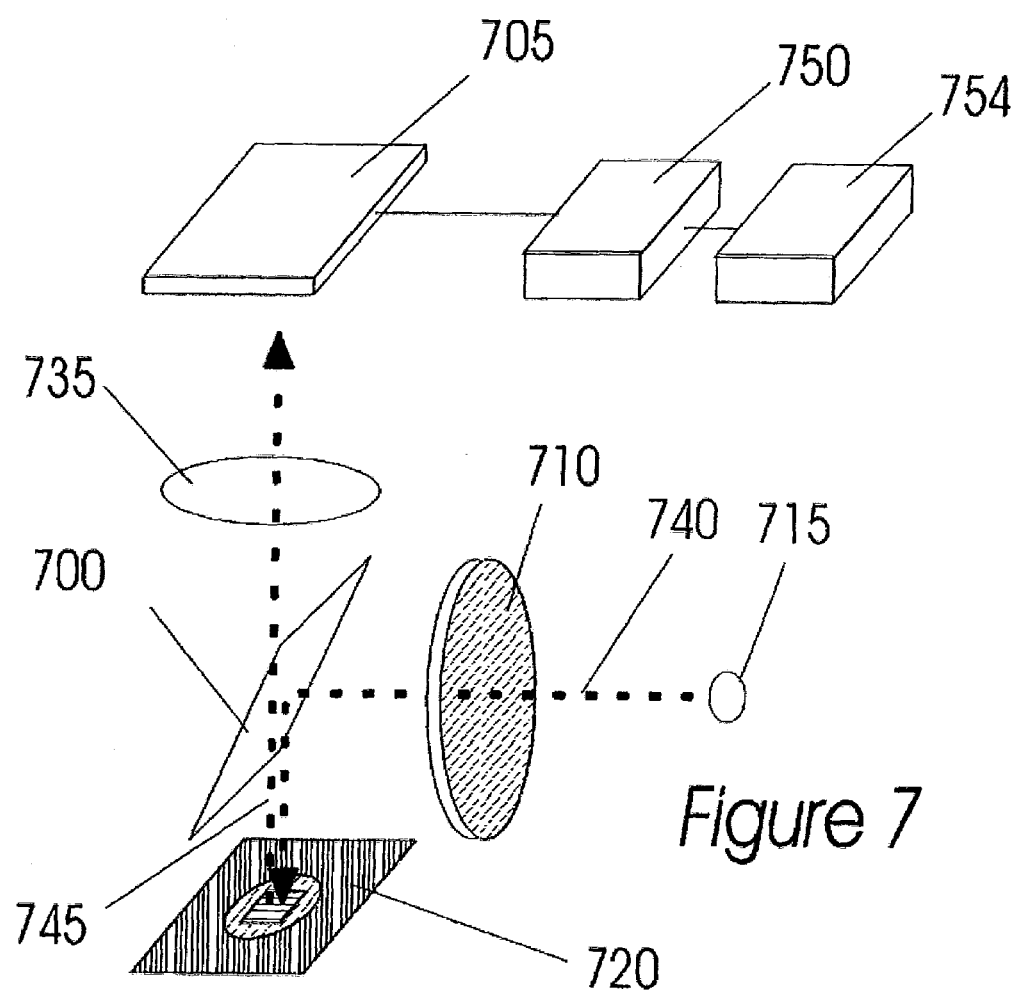
FIG. 7 is a schematic illustration of a reader device according to one embodiment of the invention for reading the characteristics of a FBS.

In a further embodiment of the invention, a reader illustrated in FIG. 7 is designed to automatically identify an FBS, such as one of the previously mentioned embodiments. For example, the reader can use a lens system 735 to image an FBS 720 having differently polarized areas 725, 730. An illumination beam 740 is deflected by a beam splitter 700 onto the FBS 720. An image beam 745 reflected from the FBS 720 passes through the beam splitter 700 and the lens system 735 to an image detector 705.

The illumination beam 740 is in the form of polarized light, which may be created by placing a polarizing filter 710 in the optical path of unpolarized light from source 715 to illuminate the FBS 720. The polarizing filter 710 may then be rotated to reveal the polarization properties of the FBS. Alternatively, a polarized illumination source 715 may be used in place of an unpolarized source 715 and the polarizing filter 710, and the polarization of the illumination source 715 may be rotated to reveal the polarization properties of the FBS. The reader may include signal processing electronics 750 and a comparison subsystem 754 to process and interpret the changes in appearance of the FBS as the polarizing filter 710 or polarized illumination source 715 is rotated. The interpreted changes in the appearance of the FBS can then be compared by the comparison system 754 such as a computer to a reference template stored in memory to verify that the FBS 720 is authentic. The reader may also include means for imaging diffracted light from the FBS due to ghosting, and comparing that diffracted light image to another reference template. If the interpreted changes match the reference templates, the FBS may be judged authentic.

One way to observe the diffracted light from the FBS using the reader of FIG. 7 is to tilt the beamsplitter 700 at approximately 12.5 degrees instead of 45 degrees, and move it leftward in FIG. 7. This will direct light from the source 715 at an angle of approximately 45 degrees onto the FBS. As a result, light diffracted into the vertical direction will be imaged by the lens 735 onto the image sensor 705. Varying the angle of tilt of beamsplitter 700 or rotating or tilting the whole reader assembly relative to the FBS will select different components of diffracted light.

The various embodiments of the present invention can of course be used in conjunction with other security devices, features and markings, or used simply as a graphical device or novelty. For example, a hologram may include an FBS in one or more sub-regions, or an FBS may be coated with high refractive index material or low refractive index material, or may be metallized with portions of the metal removed, or may be embossed into isolated islands of embossable material on a surface. An FBS can also be used together with other security features such as infra-red fluorescent inks, microtaggants, magnetic inks, DNA taggants, color-variable inks, intaglio printing, UV fluorescent inks, RFID chips, "scrambled indicia", upconversion taggants, and so on, to provide "layered" or multiple security features on a document or product.

Any suitable means of replication can be used to manufacture replicas of an FBS, including thermal embossing, UV casting, pressure molding, electroforming, solvent casting, injection molding, epoxy casting, and spray molding. The preferred means of replication however is UV casting.

An FBS without ghosting, but with regions of different orientation, can serve as a security device according to one embodiment of the present invention. An FBS with a high-frequency period slightly shorter than a half-wavelength of visible light will serve as a diffraction grating in the near UV, so will have diffractive features thereby distinguishable from an FBS whose high-frequency period is even shorter.

By providing different orientation angles and periods of low-frequency "ghost" gratings in different regions on a surface, it is possible to construct a diffraction image similar to dot matrix holograms, displaying kinetic effects, color effects, three-dimensional effects and angle-multiplexed effects. Given the basic principle disclosed here of controlled ghosting of high-frequency gratings, a skilled hologram designer or grating designer can design FBS structures to produce those effects normally observed in holograms.

A high frequency grating such as that represented in FIG. 2, or a graphical composition formed from several such gratings, can be formed on a substrate by methods such as those discussed above; and that substrate can them be coated with photoresist and exposed to a holographic interference pattern and subsequently developed and etched. The resulting relief pattern will produce polarization effects due to the high frequency grating, and diffraction effects due to the holographic exposure; and the two sets of effects will be essentially independently controllable by separately controlling the formation of the high frequency grating and the formation of the holographic interference pattern. For example, a high frequency polarization grating image can be formed using an electron beam in PMMA resist. The resulting polarization grating may be replicated by nickel electroforming, and the electroformed nickel replica may be coated with layer of photoresist such as Shipley 1450 positive resist, to a thickness just enough to fill the grooves of the polarization grating and produce a level surface. The resist-coated replica may then be subjected to a holographic exposure using standard methods, and the exposed photoresist subsequently developed in a standard way so that the minimum etch depth extends to the top of the grating ridges, and the maximum etch depth extends below the top of the grating ridges but above the bottom of the grooves. The resulting relief pattern is a high-frequency polarization grating amplitude modulated with a low-frequency holographic grating. The resulting relief pattern may be replicated by electroforming and used to produce polymer replicas.

In another example, a high-frequency grating in nickel can be pressed into a photoresist surface to produce a corresponding grating pattern in the photoresist; and the photoresist can then be exposed to a holographic interference pattern to produce a holograhically modulated polarization grating in the photoresist.

If the high-frequency gratings are curved, they will still act as polarizers and produce useful effects in an FBS. For example, a grating that consists of concentric circles will produce a typical hourglass-shaped polarization image that rotates as it is viewed through a polarizing filter that rotates. By taking the polarization angles into account, a skilled graphic designer can design images that are animated by rotating the polarization of observed or incident light.

Figure 8A:
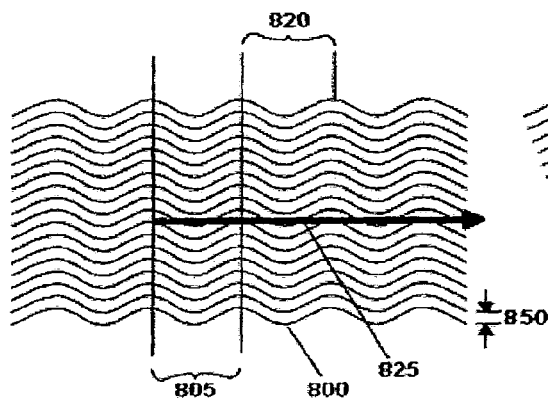
FIG. 8a represents a high-frequency FBS grating whose individual grooves are sinusoidal in shape, such that the sinusoid has a period that is long compared to the spacing between the grooves. Because the surface normal to the combined phase front of the grooves is parallel to the average direction of the grooves, the resulting low-frequency diffraction grating is oriented effectively perpendicular to the high frequency grating.
Figure 8B:
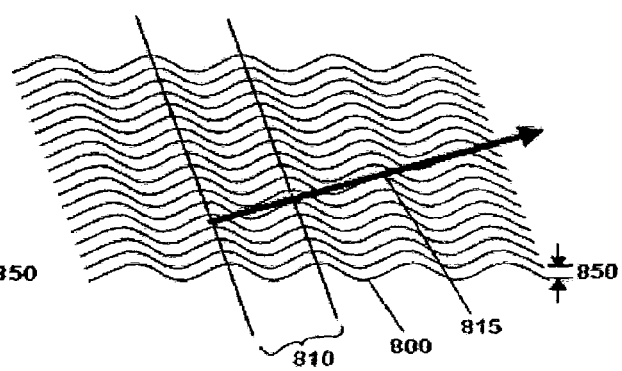
FIG. 8b represents a high-frequency FBS grating like that in FIG. 8a, except that the surface normal to the combined phase front of the grooves is at an angle to the average direction of the grooves, resulting in a low-frequency component diffraction grating oriented at an angle to the high frequency grating.

If the high frequency grating consists of sinusoid grooves or ridges 800 as shown in FIG. 8a, with a low-frequency period 805; and if the sinusoids are "stacked" as shown in FIGS. 8a and 8b to form the high-frequency grating of (nominal) period 850; the grating will have a ghosting component that corresponds to the period 810 and direction 815 of the collective low-frequency period of the grating. If the sinusoids are stacked orthogonally as indicated in FIG. 8a, the period of the ghosting is precisely the same as the period of the sinusoid. If the sinusoids are stacked in a skewed fashion as shown in FIG. 8b, the ghosting period is longer and the direction of the ghosting is at an angle to that in an orthogonally stacked set of sinusoids.

Figure 9A:
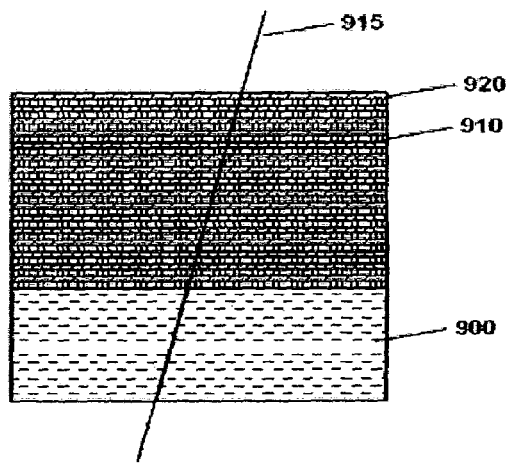
FIG. 9a represents a block of layered material on a substrate such as glass, with the block cut at an angle to the layers. The layer thicknesses are substantially less than a half wavelength of light, and alternate layers are composed of materials with substantially different solubilities in a selected solvent such as a strong alkali solution.
Figure 9B:
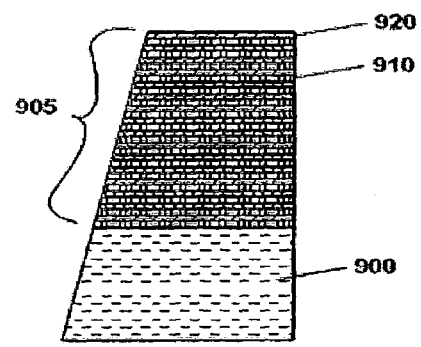
FIG. 9b represents one part of the block of FIG. 9a, showing that the effective period of the exposed ends of the layers depends on the angle at which the block is cut.
Figure 10:
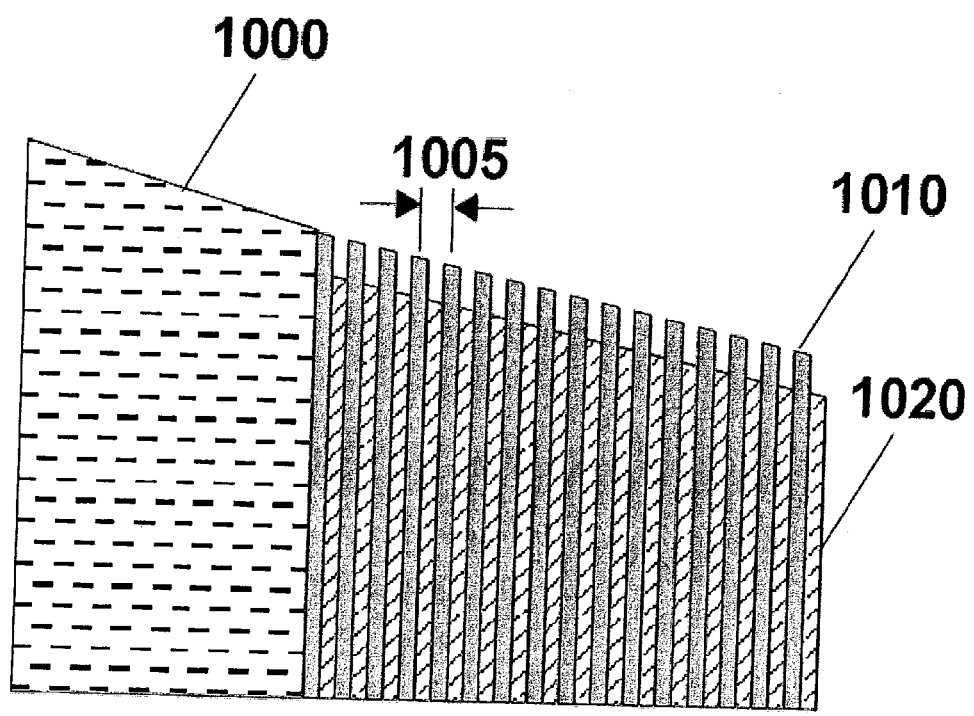
FIG. 10 represents the part of the block of FIG. 9b, after differential etching in a selected solvent. The etched surface is a grating having a period depending on the spacing of the layers and the angle at which the layers were cut.

An alternative way to fabricate a high frequency grating is illustrated in FIGS. 9a, 9b and 10. A stack of layers (920 and 910) of material having different solubilities in a selected solvent is first built on a substrate 900. For example, alternating layers of aluminum and polystyrene may be built up by alternating steps of vacuum deposition and solvent coating. The stack may then be cut at an angle 915, producing a wedge-shaped block as illustrated in FIG. 9b. The edges of the layers in FIG. 9b form a surface pattern whose period is a function of the layer thicknesses and the angle of the cut. The cut block is then etched in a suitable solvent that etches the two materials at different rates. For example, methyl ethyl ketone can be used to etch polystyrene without affecting aluminum. In FIG. 10 the results of differential etching are shown, where the edges of layers 1010 stick out farther than the edges of layers 1020. One way to make the stack of layers illustrated in FIG. 9a is to coat a substrate with a thick layer of photoresist and expose the photoresist to the standing wave pattern resulting from deep UV light passing through the photoresist and reflecting back through the photoresist from a surface such as the front or back surface of the substrate. The exposure of the photoresist to the standing wave pattern will result in a stack of Bragg planes of varying solubility.

In some applications it may be desirable to control the depth of the high-frequency grating. For example, in a transmission polarization grating the birefringence of the structure will depend on the depth of the grating. In a reflection polarization grating there may in some circumstances be a relationship between the depth of the grating and the degree or type of polarization versus the wavelength of light being affected. The depth of the high-frequency grating may be controlled by controlling the energy, current density or duration of exposure by an electron beam. Alternatively, the grating depth may be controlled by using a layer of electron resist of controlled thickness. In the grating of FIG. 10, the grating depth may be controlled by controlling the etching conditions such as solvent concentration, temperature or etch time. Typically, the preferred depth of the grating is on the order of half a wavelength of the light that the grating is intended to affect, but in some applications the optimum depth may be other than a half wavelength, such as a quarter wavelength.

High-frequency gratings used in this invention may be made by methods other than e-beam exposure of electron resists. For example, as illustrated in FIGS. 9a, 9b and 10, a block of layered materials such as alternating silicon dioxide and PMMA may be constructed, and sliced at an angle to the layers. The face exposed by the slice may then be etched so that the different materials etch differentially, forming a grating whose period is determined by the thickness of the layers and the angle of the slice relative to the layers. By this method, it is possible to construct a grating as shown in FIGS. 9a,b with a period as short as a few nanometers. The resulting high-frequency grating may then be replicated by making a nickel electroform as described above, then stepped-and-repeated by heating and pressing the nickel electroform into a polymer surface. The orientation of the electroform may be varied from point to point to control the orientation of the resulting mosaic of small gratings. By this method, it is also possible to fabricate gratings whose periods are small enough to polarize and diffract x-rays.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A graphical composition comprising a high-frequency surface relief grating structure having different grating characteristics in different regions on a surface, the grating structure having a first grating period, the grating structure altering the polarization of light incident on the grating structure so that reflected light having a selected polarization forms a predetermined graphical design arrangement in the different regions on the surface.

2. The graphical composition of claim 1 wherein the different grating characteristics comprise one of the following: orientation, period, phase, amplitude and shape of the grating structure.

3. The graphical composition of claim 1, wherein the grating structure characteristics present a predetermined appearance when viewed through a polarizing filter.

4. The graphical composition of claim 1, wherein the grating structure characteristics present a predetermined appearance when illuminated with polarized light.

5. The graphical composition of claim 1, wherein the grating structure presents a predetermined first image when illuminated in polarized light, and wherein the grating structure characteristics are modulated with a second grating pattern having a second period, the second period being longer than the first grating period.

6. The graphical composition of claim 5 wherein the period, amplitude, and orientation of the second grating pattern are selected to cause diffraction of the light incident on the grating structure, the diffraction of light presenting a predetermined appearance when illuminated and viewed at predetermined angles.

7. The graphical composition of claim 5 wherein the high-frequency surface relief grating structure presents the appearance of a first graphical composition when viewed in polarized light and the second grating pattern presents the appearance of a second graphical composition when illuminated at predetermined angles.

8. The graphical composition of claim 5 wherein the second grating pattern comprises a hologram.

9. The graphical composition of claim 1 wherein the high-frequency surface relief grating structure is applied to any of the set of items comprising: identification cards, checks, currency, credit cards, gift cards, access control cards, hang tags, decals, stickers, labels, authentication certificates, envelopes, packages, pharmaceuticals containers, pharmaceuticals capsules, licenses, license plates, vehicle use permits, coupons, wrist bands, official documents, certificates of title, optical recording media, CD-ROMs, DVDs, injection molded products, pressure molded products, embossed products, calendared products, passports, security seals, tamper-evident seals, coins, tokens, tickets, transit passes, packaging films and packaging components.

10. The graphical composition of claim 1 wherein the high-frequency surface relief grating structure comprises a replication of an FBS structure fabricated by embossing, casting, injection molding, pressure molding, calendaring, engraving, or soft lithography.

11. A relief grating surface having a grating period at each point on the surface, the grating period on at least a first portion of the surface being shorter than half a wavelength of a selected color of light, the first portion of the surface presenting polarization effects that vary in a substantially random manner from point to point on the surface, the polarizing effects resulting from the short grating period in the first portion.

12. An anticounterfeiting system comprising:
a graphical composition formed in a surface relief grating bearing both polarization and diffraction components in patterns; and
a reader comprising:
an illumination subsystem operable to direct illumination light on the graphical composition;
an image detecting subsystem operable to receive and process the illumination light reflected from the graphical composition;
an image interpretation subsystem operable to receive a signal indicative of the reflected light detected and processed by the imaging subsystem, the image interpretation subsystem determining features of the pattern of polarization and diffraction components of the surface relief grating; and
a comparison subsystem coupled to the image interpretation device, the comparison subsystem comparing the features of the patterns of the polarization and diffraction components of the surface relief grating pattern to a set of reference features and thereby determine the authenticity of the graphical composition.

13. The anticounterfeiting system of claim 12 wherein at least one of the polarization and diffraction component patterns is substantially random within at least one predetermined region.

14. A reader for reading a graphical composition formed in a surface relief grating bearing both polarization and diffraction components in patterns, the reader comprising:
an illumination subsystem operable to direct illumination light on the graphical composition;
an image detecting subsystem operable to receive and process the illumination light reflected from the graphical composition; and
an image interpretation subsystem operable to receive a signal indicative of the reflected light detected and processed by the imaging subsystem, the image interpretation subsystem determining features of the pattern of polarization and diffraction components of the surface relief grating.

15. The reader of claim 14, further comprising a comparison subsystem coupled to the image interpretation device, the comparison subsystem comparing the features of the patterns of the polarization and diffraction components of the surface relief grating pattern to a set of reference features.

* * * * *